United States Patent
Kobayashi et al.

(10) Patent No.: US 7,463,463 B2
(45) Date of Patent: Dec. 9, 2008

(54) MOTOR CONTROLLER AND MOTOR TEMPERATURE ESTIMATION METHOD FOR THE SAME

(75) Inventors: Shigeru Kobayashi, Toyohashi (JP); Tatsuya Suzuki, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 338 days.

(21) Appl. No.: 11/483,682

(22) Filed: Jul. 11, 2006

(65) Prior Publication Data

US 2007/0153434 A1 Jul. 5, 2007

(30) Foreign Application Priority Data

Jul. 15, 2005 (JP) .............................. 2005-207622

(51) Int. Cl.
*H02H 5/04* (2006.01)

(52) U.S. Cl. .............................. 361/25; 361/1; 361/103; 361/104; 361/105; 361/107; 361/124; 318/471; 318/470

(58) Field of Classification Search ...................... 361/1, 361/25, 103, 124, 104, 105, 107; 318/471, 318/470

See application file for complete search history.

(56) References Cited

U.S. PATENT DOCUMENTS

| | | | | |
|---|---|---|---|---|
| 4,381,074 A | * | 4/1983 | Iijima et al. .................... 236/13 |
| 5,224,353 A | * | 7/1993 | Nagasawa ..................... 62/209 |
| 5,351,439 A | * | 10/1994 | Takeda et al. .................. 49/28 |
| 5,539,601 A | * | 7/1996 | Farag ........................... 361/23 |
| 5,816,061 A | * | 10/1998 | Lee et al. ....................... 62/187 |
| 6,897,782 B2 | * | 5/2005 | Heinrich et al. ............. 340/588 |
| 6,962,491 B2 | * | 11/2005 | Nishizawa et al. ........... 425/143 |
| 7,091,686 B2 | * | 8/2006 | Kagei .......................... 318/434 |
| 7,302,202 B2 | * | 11/2007 | Tai et al. ........................ 399/92 |
| 2005/0242760 A1 | * | 11/2005 | Fujita et al. .................. 318/434 |

FOREIGN PATENT DOCUMENTS

| | | |
|---|---|---|
| JP | Y2-6-49074 | 1/1987 |
| JP | A-11-164472 | 6/1999 |

* cited by examiner

*Primary Examiner*—Rita Leykin
(74) *Attorney, Agent, or Firm*—Posz Law Group, PLC

(57) ABSTRACT

A motor controller includes: an estimated temperature calculating section that calculates and stores an estimated temperature of a motor, and a control section that can perform a drive control of the motor only when this estimated temperature is not larger than a predetermined value. When the motor is stopped, a second temperature gradient while the temperature of the motor decreases from a stop-time temperature to a predetermined first set temperature is stored in correspondence to the stop-time temperature. The first temperature gradient corresponding to the estimated temperature at a time when the motor is stopped is calculated by using the first temperature gradient storing means, if the estimated temperature stored in the estimated temperature storing means when the motor is stopped is larger than the first set temperature. The estimated temperature stored in the estimated temperature storing means is updated according to a lapse of a stopping time of the motor by using the first temperature gradient calculated by the first temperature gradient calculating means.

9 Claims, 7 Drawing Sheets

MOTOR CONTROLLER AND MOTOR TEMPERATURE ESTIMATION METHOD FOR THE SAME

CROSS REFERENCE TO RELATED APPLICATION

This application is based upon and claims the benefit of priority of Japanese Patent Application No. 2005-207622 filed on Jul. 15, 2005, the content of which is incorporated herein by reference.

FIELD OF THE INVENTION

The present invention relates to a motor controller and, in particular, to a motor controller that has the function of calculating the estimated temperature of a motor so as to protect the motor from being burned.

BACKGROUND OF THE INVENTION

Conventionally, in order to protect a motor from being burned, a protection element such as a bimetal or a PTC is built in a motor housing. When a motor abnormally generates heat, an electric circuit is interrupted by this protection element and the passage of electric current through the motor is stopped.

However, when the above-mentioned protection element is arranged near the motor, the size of the motor is enlarged to increase the size of an entire device. Therefore, in a motor controller described in JP-H11-164472-A, the above-mentioned protection element is not provided but a control section for driving and controlling the motor calculates the estimated temperature of the motor on the basis of the magnitude of voltage applied to the motor, a period of time during which voltage is applied to the motor, and the last estimated temperature. In the motor controller described in JP-H11-164472-A, when a calculated estimated temperature becomes not less than a predetermined overheat protection temperature, driving the motor is stopped and a stopping state is further kept until the estimated temperature reaches an overheat protection release temperature.

By the way, to calculate the estimated temperature of a motor after stopping the operation of the motor, an estimation equation using only a stopping time that passes while the motor is stationary as a parameter is generally used and the estimation equation does not take a change in the ambient temperature during the stopping time into account. Hence, there is presented a problem that the accuracy of the estimated temperature of the motor (winding) is not good.

Moreover, there is presented the following problem: when a first-order approximate equation is used in the processing of calculating the estimated temperature of a motor when the motor is stopped, the accuracy of the estimated temperature is degraded; however, when a try to calculate the estimated temperature with higher accuracy is made, the processing load of a control section is increased and hence an expensive microcomputer or the like needs to be used for the control section.

SUMMARY OF THE INVENTION

In view of the above-mentioned problems, the object of the present invention to provide a motor controller capable of performing the processing of estimating the temperature of a motor after stopping the motor with high accuracy and with light load and a motor temperature estimation method.

The motor controller is provided with an estimated temperature calculating section that calculates an estimated temperature of a motor, and a motor control section that can perform a drive control of the motor only when the estimated temperature is not larger than a predetermined value.

The estimated temperature calculating section is provided with a first temperature gradient storing means, a first temperature gradient calculating means, and a first estimated temperature updating means. The first temperature gradient storing means that stores a second temperature gradient while the temperature of the motor decreases from a stop-time temperature to a predetermined first set temperature in correspondence to the stop-time temperature when the motor is stopped. The first temperature gradient calculating means that calculates the first temperature gradient corresponding to the estimated temperature at a time when the motor is stopped from the first temperature gradient storing means in a case that the estimated temperature stored in the estimated temperature storing means when the motor is stopped is larger than the first set temperature. The first estimated temperature updating means that updates the estimated temperature stored in the estimated temperature storing means according to a lapse of a stopping time of the motor by using of the first temperature gradient calculated by the first temperature gradient calculating means.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Hereinafter, one embodiment of the present invention will be described with reference to the drawings. Of course, the construction and the procedure to be described below do not limit the present invention but can be variously modified according to the spirit of the invention.

Figure 1:
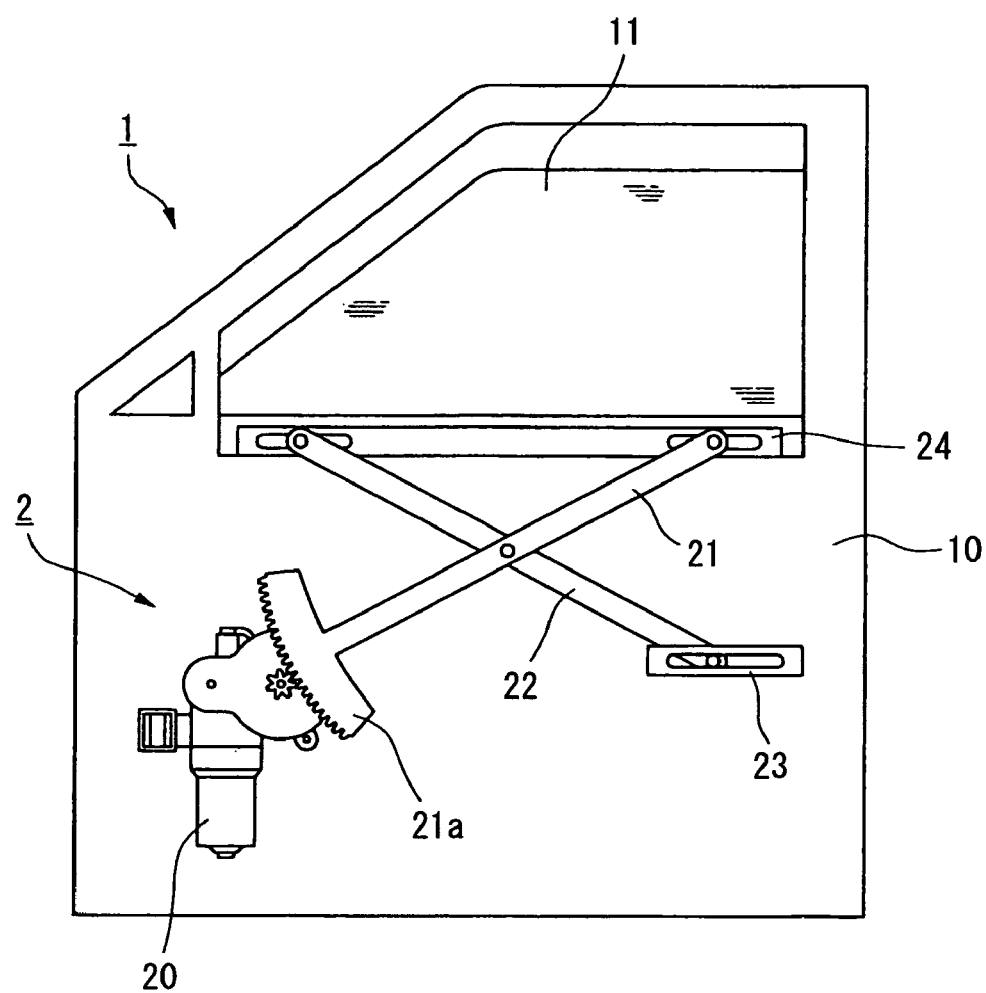
FIG. 1 is an explanatory diagram of a power window device according to one embodiment of the present invention.
Figure 2:
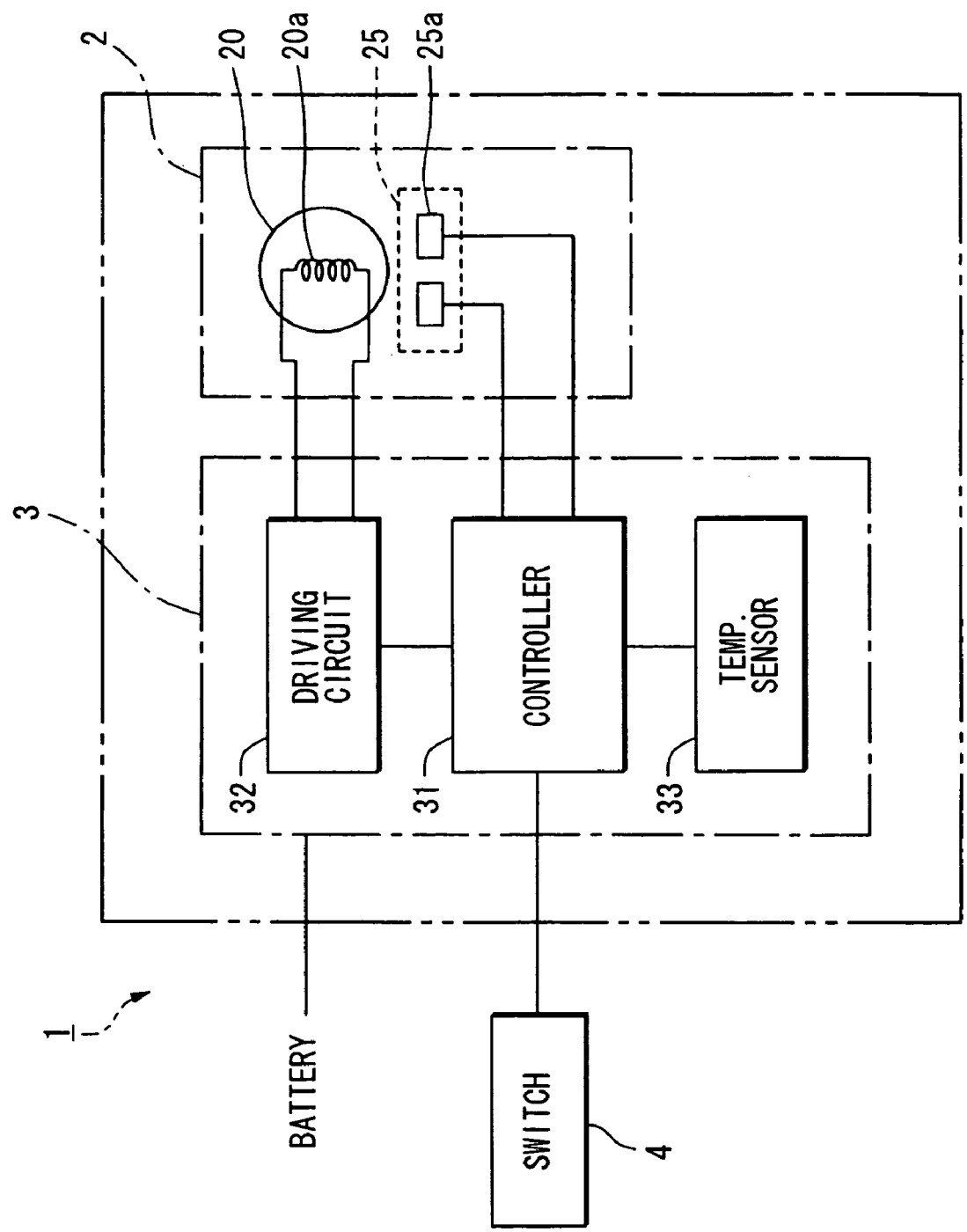
FIG. 2 is an electric configuration diagram of the power window device in FIG. 1.
Figure 3A:
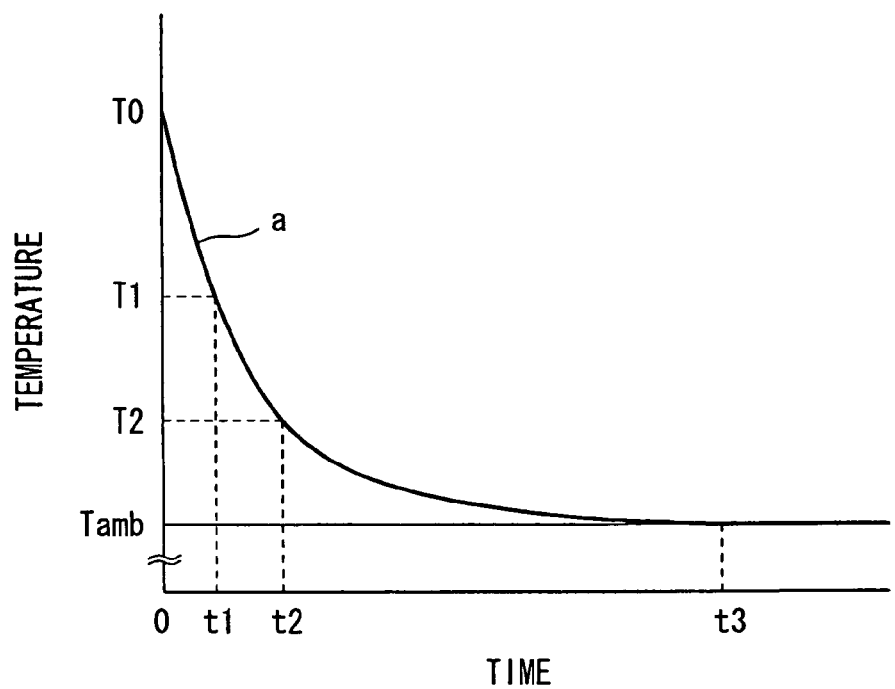
FIGS. 3A and 3B are graphs to show a change in a motor temperature after a motor is stopped.
Figure 3B:
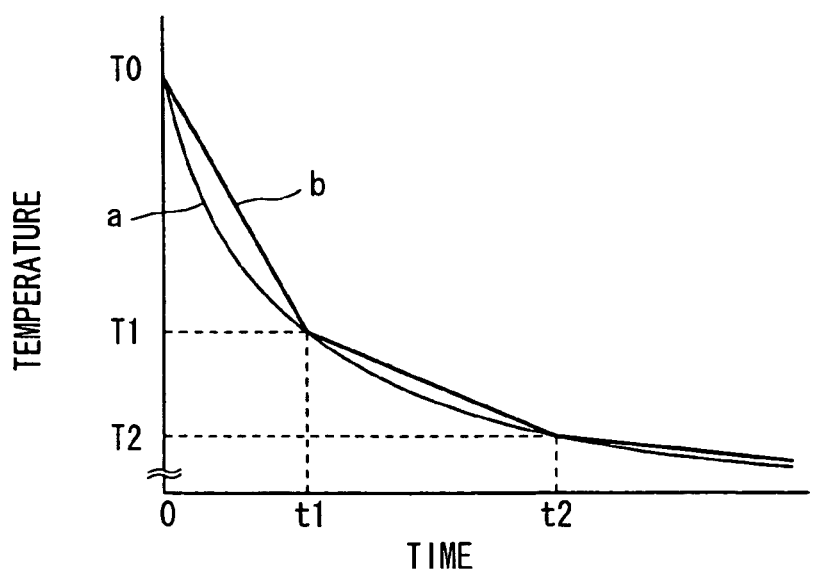
Figure 4A:
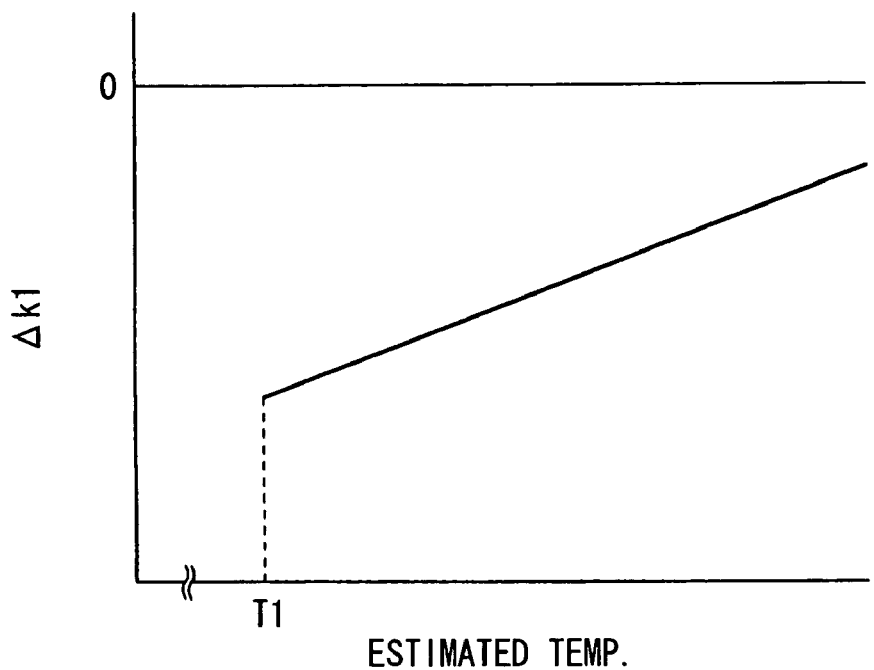
FIG. 4A is a graph to show a relationship between an estimated temperature and a first temperature gradient when a motor is stationary and FIG. 4B is a graph to show a relationship between an estimated temperature and a first temperature subtraction time when a motor is stationary.
Figure 4B:
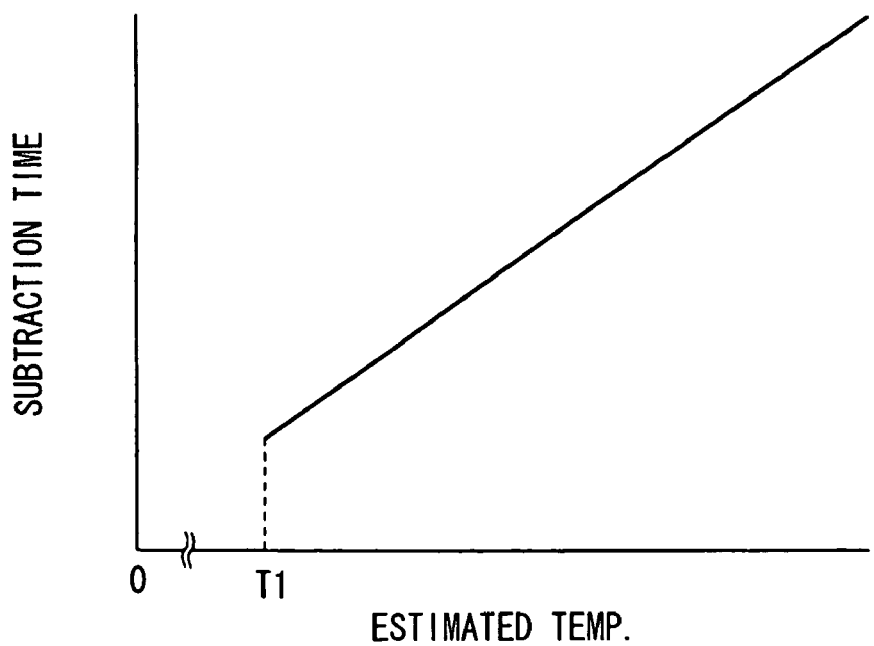
Figure 5:
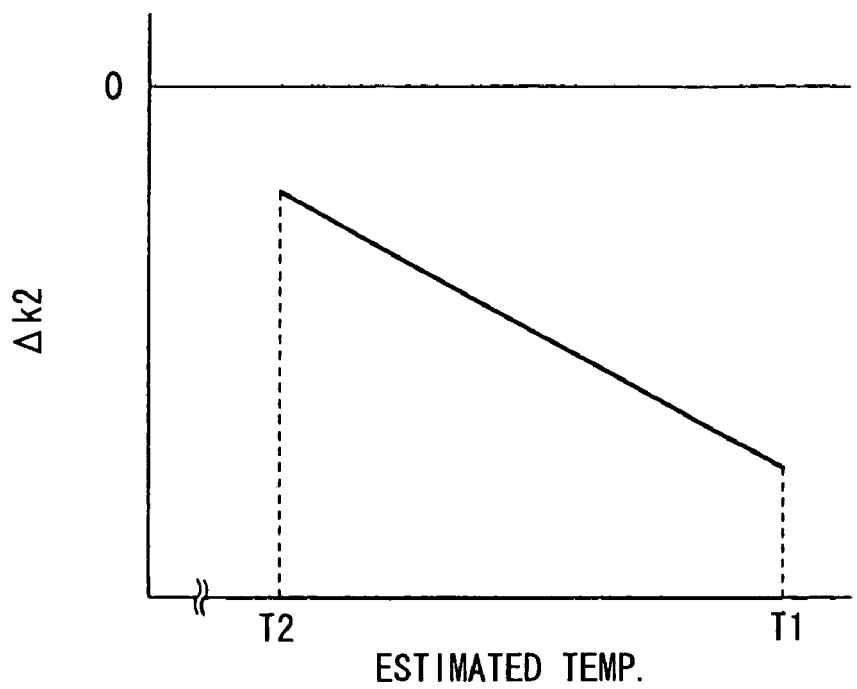
FIG. 5 is a graph to show a relationship between the estimated temperature of a motor and a second temperature gradient.
Figure 6:
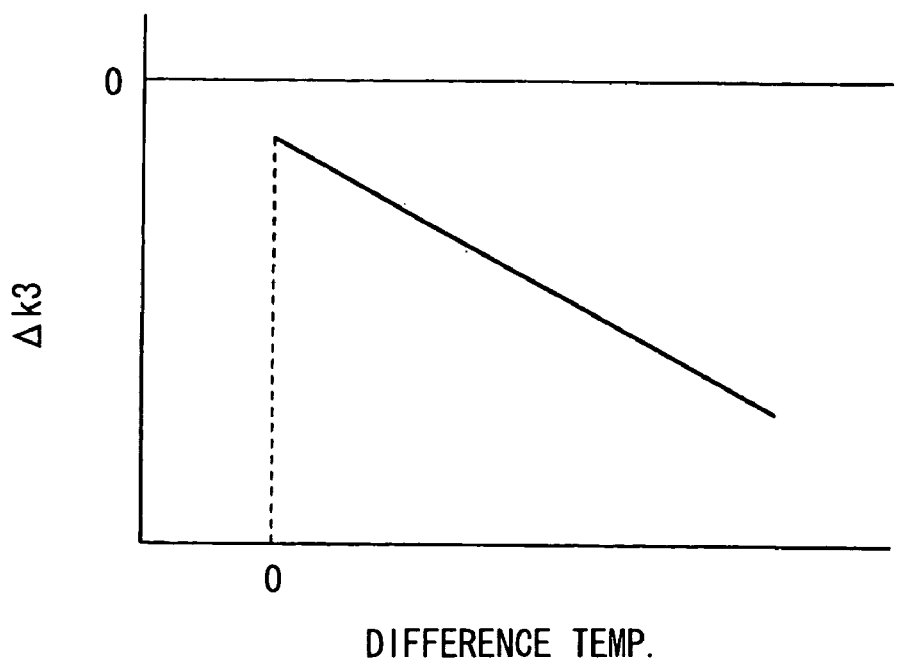
FIG. 6 is a graph to show a relationship between the estimated temperature of a motor and a temperature gradient in a steady state.
Figure 7:
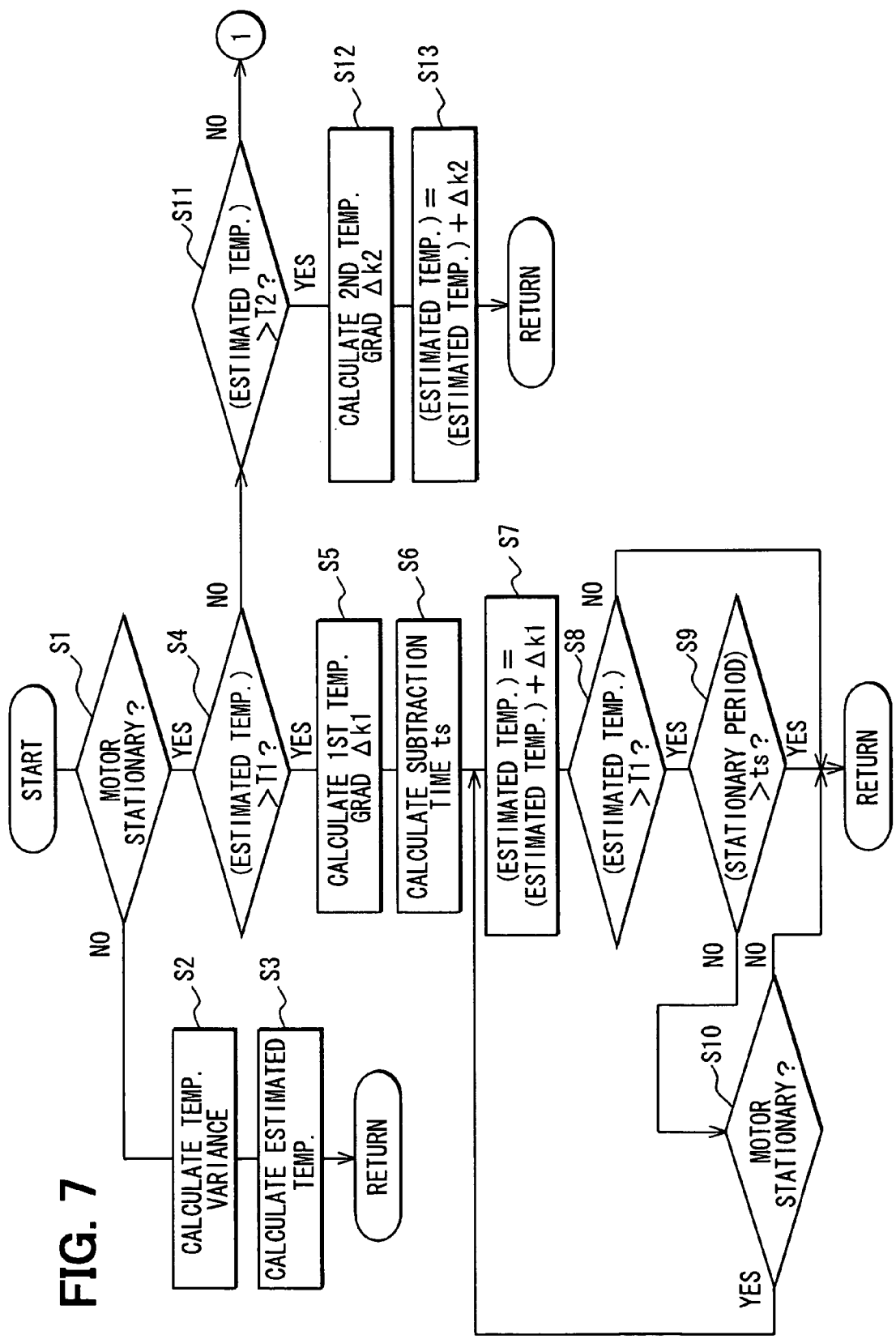
FIG. 7 is a processing flow of motor estimated temperature calculating processing.
Figure 8:
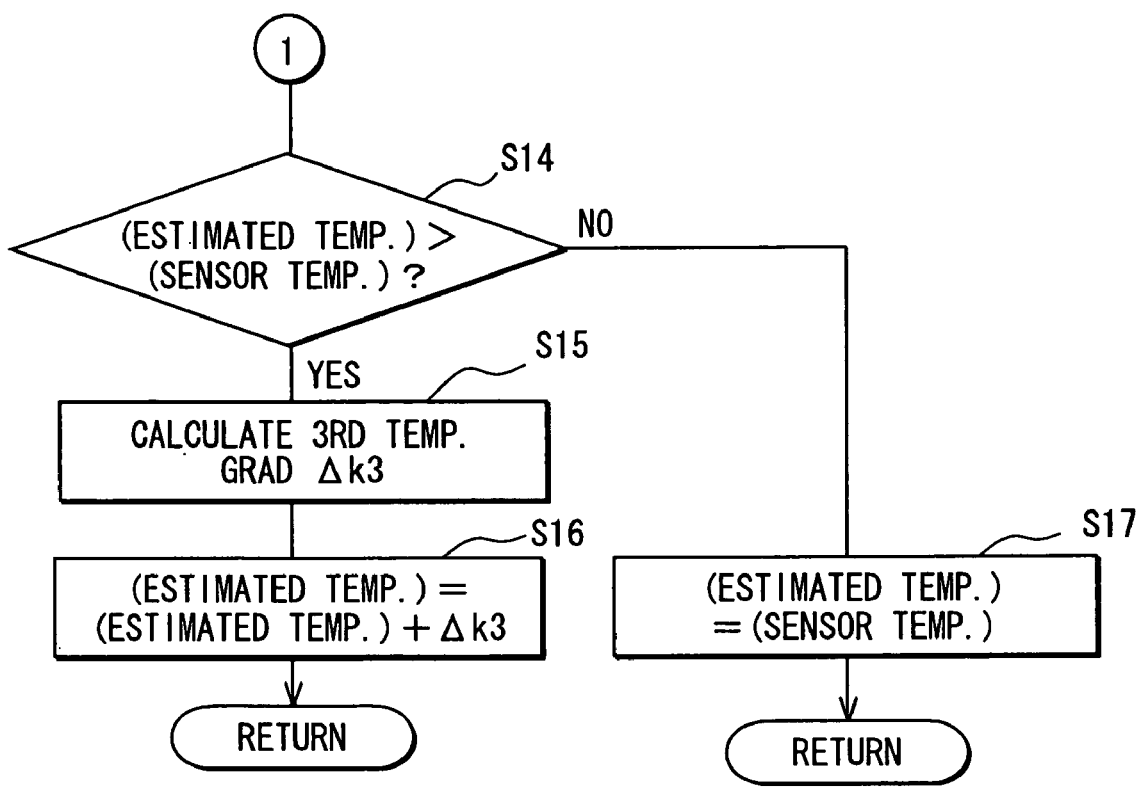
FIG. 8 is a processing flow of motor estimated temperature calculating processing.

FIGS. 1 to 8 are the drawings relating to one embodiment of the present invention. FIG. 1 is an explanatory diagram of a power window device. FIG. 2 is an electric configuration diagram of the power window device in FIG. 1. FIGS. 3A and 3B are graphs to show a change in a motor temperature after a motor is stopped. FIG. 4A is a graph to show a relationship between an estimated temperature and a first temperature gradient when a motor is stationary and FIG. 4B is a graph to show a relationship between an estimated temperature and a first temperature subtraction time when a motor is stationary. FIG. 5 is a graph to show a relationship between the estimated temperature of a motor and a second temperature gradient. FIG. 6 is a graph to show a relationship between the estimated temperature of a motor and a temperature gradient in a steady state. FIG. 7 and FIG. 8 are processing flows of motor estimated temperature calculating processing.

Hereinafter, one embodiment will be described in which the motor controller of the present invention is applied to a power window device. An explanatory diagram of a power window device 1 of this embodiment (hereinafter, referred to as "device 1") is shown in FIG. 1 and its electric configuration diagram is shown in FIG. 2. The power window device 1 of this embodiment moves up and down (closes and opens) a window glass 11 as a moving member arranged in a door 10 of a vehicle by rotating and driving a motor 20. The power window device 1 has main constituent elements of: a moving up/down mechanism 2 for opening and closing the window glass 11; a control section 3 for controlling the operation of the moving up/down mechanism 2; and an operating switch 4 by which an occupant provides an operation instruction.

In this embodiment, the window glass 11 is moved up and down between an upper fully-closed position and a lower fully-opened position along a rail (not shown).

The moving up/down mechanism 2 of this embodiment has main constituent elements of: the motor 20 that has a speed reduction mechanism fixed to the door 10; a moving up/down arm 21 that has a gear 21a shaped like a fan and driven by the motor 20; a driven arm 22 that is mounted on the cross to and is rotatably supported by the moving up/down arm 21: a fixed channel 23 fixed to the door 10; and a glass-side channel 24 integrated with the window glass 11.

The motor 20 of this embodiment is constructed as follows: when the motor 20 is supplied with electric power from the control section 3, the motor 20 has electric current passed through the winding 20a of its armature to thereby produce a magnetic attracting action between the armature and a stator having a magnet, whereby the armature is normally and reversely rotated. In the moving up/down mechanism 2 of this embodiment, when the moving up/down arm 21 and the driven arm 22 swing in response to the rotation of the motor 20, the moving up/down arm 21 and the driven arm 22 have their respective end parts restricted so as to slide by the channels 23, 24 and are driven as an X link to thereby move up and down the window glass 11.

A rotation detecting device (position detecting device) 25 is integrated with the motor 20 of this embodiment. The rotation detecting device 25 outputs a pulse signal synchronous with the rotation of the motor 20 to the control section 3. The rotation detecting device 25 of this embodiment is constructed so as to detect a magnetic change in the magnet turning with the output shaft of the motor 20 by a plurality of Hall elements 25a.

The control section 3 calculates a position to which or from which the window glass 11 is moved up or down by this pulse signal. Moreover, the control section 3 can calculate the rotational speed of the motor 20 or the moving up/down speed of the window glass 11 corresponding to the rotational speed of the motor 20 by the interval of the pulse signals.

In this embodiment, a device using the Hall elements is adopted as the rotation detecting device 25. However, any encoder capable of detecting the rotational speed of the motor 20 may be adopted as the rotation detecting device 25. Moreover, in this embodiment, to detect the rotational speed of the output shaft of the motor 20 related to the movement of the window glass 11, the rotation detecting device 25 is integrated with the motor 20. However, the moving speed of the window glass 11 may be detected by well-known means.

The control section 3 of this embodiment is constructed in such a way that a controller 31, a drive circuit 32, and a temperature sensor 33 are arranged on a substrate. These parts are supplied with electric power necessary for operation from a battery mounted in the vehicle.

The controller 31 of this embodiment is constructed of a microcomputer including: a CPU; a memory such as a ROM or a RAM; an input circuit; and an output circuit. The CPU, the memory, the input circuit, and the output circuit are connected to each other through a bus.

The controller 31 usually rotates the motor 20 normally and reversely through the drive circuit 32 on the basis of an operation signal from the operating switch 4 to thereby open and close the window glass 11.

The drive circuit 32 of this embodiment is constructed of an IC including a FET and changes the polarity of electric power supplied to the motor 20 on the basis of a control signal from the controller 31. That is, when the drive circuit 32 receives a normal rotation command signal from the controller 31, the drive circuit 32 supplies electric power to the motor 20 so as to rotate the motor 20 in a normal rotational direction. When the drive circuit 32 receives a reverse rotation command signal from the controller 31, the drive circuit 32 supplies electric power to the motor 20 so as to rotate the motor 20 in a reverse rotational direction. The drive circuit 32 may be constructed so as to change the polarity by the use of a relay circuit. Moreover, the drive circuit 32 may be constructed so as to be incorporated into the controller 31.

The temperature sensor 33 of this embodiment detects temperature around the substrate where the controller 31 and the like are arranged and is arranged at a position away from the motor 20 in this embodiment.

The controller 31 receives an ambient temperature detection signal from the temperature sensor 33 and calculates an ambient temperature around the substrate on the basis of this signal. The temperature sensor 33 and the controller 31 correspond to an ambient temperature sensing section of the present invention.

Moreover, the controller 31 as a motor control section counts the magnitude of voltage applied to the motor 20 via the drive circuit 32 and the length of time that electric current is passed. Moreover, the controller 31 monitors the rotational speed of motor 20 by a pulse signal from the rotation detecting device 25.

The controller 31 stores the estimated temperature of the winding 20a (motor estimated temperature) in a temperature counter as estimated temperature storing means set in the memory 41. Moreover, the controller 31 stores reference data to calculate this estimated temperature in the memory 41. The controller 31 as estimated temperature calculating means calculates the variation (correction value) of the estimated temperature from the ambient temperature, the applied voltage, the length of time that electric current is passed, the rotational speed, and the reference data of them, and the present estimated temperature, and adds this variation to the present estimated temperature to thereby calculate a new estimated temperature. This processing of calculating the estimated temperature is repeatedly performed at intervals of a predetermined repetition processing time.

In this embodiment, the estimated temperature of the winding 20a is especially calculated. However, the estimated temperature of the entire motor 20 may be calculated.

The controller 31 stops electric power supply from the drive circuit 32 according to this estimated temperature to thereby prevent the winding 20a from being burned. Thus, in the device 1 of this embodiment, the electric power supply is stopped on the basis of the estimated temperature of the winding 20a calculated by the controller 31 to thereby protect the winding 20a from being burned. In this embodiment, a comparatively large protection element such as a bimetal or a PTC does not need to be arranged in the main body of the motor 20 so as to detect the temperature of the winding 20a and hence the motor 20 can be reduced in size.

Moreover, the controller 31 as first temperature gradient storing means stores first temperature gradient data, which sets the relationship of a first temperature gradient $\Delta k1$ (K/s) and a first temperature subtraction time ts (s) to the temperature of the motor 20 when the motor 20 is stopped, in a memory. With this, the controller 31 as first temperature gradient calculating means calculates a first temperature gradient $\Delta k1$ and a first subtraction time ts uniquely by a relationship equation from the temperature of the motor 20 when the motor 20 is stopped.

This first temperature gradient $\Delta k1$ is set for an estimated temperature within a temperature range of a first set temperature T1 or more and corresponds to a temperature subtraction rate per unit time for performing subtractions to reduce the estimated temperature when the motor 20 is stopped to the first set temperature T1. Moreover, the first subtraction time ts corresponds to the time required to perform subtractions to reduce the estimated temperature to the first set temperature T1 at the first temperature gradient $\Delta k1$.

The controller 31 as first estimated temperature updating means updates (performs subtractions to reduce) the estimated temperature from the value of the estimated temperature when the motor 20 is stopped to the first set temperature T1 with the lapse of a motor stopping time within the first temperature subtraction time ts by the use of the calculated first temperature gradient $\Delta k1$. As will be described later, the situation in which the motor temperature is reduced to the first set temperature T1 under a predetermined ambient temperature can be approximated with high accuracy by the use of the first temperature gradient $\Delta k1$ and the first temperature subtraction time ts.

Moreover, the controller 31 as second temperature gradient storing means stores second temperature gradient data for setting a relationship between an estimated temperature and a second temperature gradient $\Delta k2$ (K/s). With this, the controller 31 as second temperature gradient storing means calculates a second temperature gradient $\Delta k2$ uniquely from the estimated temperature by the use of a relationship equation.

This second temperature gradient $\Delta k2$ is set for the estimated temperature within a temperature range from a second set temperature T2 to the first set temperature T1 and corresponds to a temperature subtraction rate per unit time for performing subtractions to reduce the estimated temperature to the second set temperature T2.

The controller 31 as second temperature gradient storing means updates (performs subtractions to reduce) the estimated temperature to the second set temperature T2 with the lapse of a motor stopping time by the use of the calculated second temperature gradient $\Delta k2$. As will be described later, the situation in which the motor temperature is reduced from the first set temperature T1 to the second set temperature T2 under a predetermined ambient temperature can be approximated with high accuracy by the use of the second temperature gradient $\Delta k2$.

Moreover, the controller 31 as steady temperature gradient storing means stores steady temperature gradient data for setting the relationship of a difference temperature between an estimated temperature and an ambient temperature to a steady temperature gradient (third temperature gradient $\Delta k3$ (K/s)). With this, the controller 31 as steady temperature gradient storing means calculates a steady temperature gradient $\Delta k3$ uniquely from a difference temperature by the use of a relationship equation.

This steady temperature gradient $\Delta k3$ is set for a difference temperature within a temperature range from nearly the second set temperature T2 to the ambient temperature and corresponds to a temperature subtraction rate per unit time for performing subtractions to reduce the estimated temperature to the ambient temperature.

The controller 31 as the steady estimated temperature gradient updating means updates (performs subtractions to reduce) the estimated temperature to the ambient temperature with the lapse of a motor stopping time by the use of the calculated steady temperature gradient $\Delta k3$. As will be described later, the situation in which the motor temperature is reduced from the second set temperature T2 to the ambient temperature under a predetermined ambient temperature can be approximated with high accuracy by the steady temperature gradient $\Delta k3$.

The operating switch 4 of this embodiment is constructed of a toggle type switch or the like to be operated in two steps and is provided with an opening switch, a closing switch, and an automatic switch. When an occupant operates this operating switch 4, a command signal to open and close the window glass 11 is outputted to the controller 31.

Specifically, when the operating switch 4 is operated one step to one end side, the opening switch is turned on and a normal opening command signal to normally open the window glass 11 (that is, to open the window glass 11 only while the opening switch is being operated) is outputted to the controller 31. Moreover, when the operating switch 4 is operated one step to the other end side, the closing switch is turned on and a normal closing command signal to normally close the window glass 11 (that is, to close the window glass 11 only while the opening switch is being operated) is outputted to the controller 31.

While the controller 31 receives the normal opening command signal from the operating switch 4 (while the operating switch 4 is being operated), the controller 31 drives the motor 20 through drive circuit 32 to normally open the window glass 11. By contrast, while the controller 31 receives the normal closing command signal from the operating switch 4 (while the operating switch 4 is being operated), the controller 31 drives the motor 20 through drive circuit 32 to normally close the window glass 11.

Moreover, when the operating switch 4 is operated two steps to one end side, both of the opening switch and the automatic switch are turned on to thereby output an automatic opening command signal for automatically opening the window glass 11 (that is, to open the window glass 11 to a fully-opened position even when operating the operating switch 4 is stopped) to the controller 31. Moreover, When the operating switch 4 is operated two steps to the other end side, both of the closing switch and the automatic switch are turned on to thereby output an automatic closing command signal for automatically closing the window glass 11 (that is, to close the window glass 11 to a fully-closed position even when operating the operating switch 4 is stopped) to the controller 31.

Moreover, when the controller 31 receives the automatic opening command signal from the operating switch 4, the controller 31 drives the motor 20 via the drive circuit 32 to thereby automatically open the window glass 11 to the fully-opened position. By contrast, when the controller 31 receives the automatic closing command signal from the operating switch 4, the controller 31 drives the motor 20 via the drive circuit 32 to thereby automatically close the window glass 11 to the fully-closed position.

Next, the processing of calculating a motor estimated temperature by the device 1 of this embodiment will be described on the basis of FIG. 5.

In the device 1 of this embodiment, the controller 31 calculates the estimated temperature. Specifically, the controller 31 has a temperature counter and adds a correction value (variation temperature), which is calculated by repetition processing performed at intervals of a predetermined time, to this temperature counter to always update the estimated temperature of the winding 20a.

As described above, while the motor 20 is operating, the controller 31 calculates a temperature change rate (gradient of temperature change) every repetition processing from the ambient temperature, the applied voltage, the length of time that electric current is passed, the rotational speed, and reference data, and the present temperature, and calculates a correction value on the basis of this temperature change rate, and adds this correction value to the present temperature counter, thereby updating the temperature counter. When this temperature counter reaches a predetermined temperature value, the controller 31 stops supplying electric power to the motor 20 by the drive circuit 32.

By contrast, while the motor 20 is stationary, the controller 31 calculates the first temperature gradient $\Delta k1$ and the first temperature subtraction time ts according to the temperature when the motor 20 is stopped (that is, the value of the temperature counter expressing an estimated temperature T0 when the motor 20 is stopped) and updates (performs subtractions to reduce) the temperature counter to a predetermined first set temperature T1 with the lapse of a motor stopping time within this first temperature subtraction time ts by the use of the first temperature gradient $\Delta k1$ (first temperature counter updating processing). That is, the value of the temperature counter is reduced by subtractions according to a linear function with respect to a motor stopping time from the temperature T0 when the motor 20 is stopped to the first set temperature T1 at a rate expressed by the first temperature gradient $\Delta k1$.

In this embodiment, the first set temperature T1 is set near a point of inflection of a curve expressing a decreasing motor temperature when the motor 20 is stopped under a predetermined ambient temperature.

In this manner, in the first temperature counter updating processing of this embodiment, the controller 31 updates the temperature counter by the repetition processing of adding a correction value proportional to the length of time that passes while the motor 20 is stationary until the value of the temperature counter reaches the first set temperature T1 by the use of the first temperature gradient $\Box k1$ uniquely determined by the value of the temperature counter when the motor 20 is stopped. Therefore, the processing is simple and hence a processing load applied to the controller 31 can be reduced.

When the value of the temperature counter reaches the first set temperature T1, the controller 31 performs the second temperature counter updating processing. In this second temperature counter updating processing, the controller 31 performs the repetition processing of performing subtractions to reduce the value of the temperature counter from the first set temperature T1 to the second set temperature T2. The second set temperature T2 is set between the usual ambient temperature range in which the device 1 is arranged and the first set temperature T1.

In this repetition processing, the controller 31 calculates a second temperature gradient $\Delta k2$ corresponding to the value of the temperature counter every time the repetition processing is performed and calculates a correction value proportional to the interval of performing the repetition processing by the use of this second temperature gradient $\Delta k2$ and adds this correction value to the temperature counter, thereby updating (performing subtractions to reduce) the temperature counter. In this manner, the second temperature counter updating processing is simple and hence a processing load applied to the controller 31 can be reduced.

Moreover, when the value of the temperature counter reaches the second set temperature T2, the controller 31 performs the steady processing of updating the temperature counter. In this steady processing of updating the temperature counter, the controller 31 performs the repetition processing of performing subtractions to reduce the value of the temperature counter from the second set temperature T2 to the ambient temperature Tamp calculated on the basis of an ambient temperature detection signal of the temperature sensor 33.

In this repetition processing, the controller 31 subtracts the ambient temperature based on the temperature sensor 33 at that time from the value of the temperature counter every time the repetition processing is performed to calculate a difference temperature, and calculates a steady temperature gradient $\Delta k3$ corresponding to this difference temperature, and calculates a correction value proportional to the interval of performing the repetition processing by the use of this steady temperature gradient $\Delta k3$, and adds this correction value to the temperature counter, thereby updating (performing subtractions to reduce) the temperature counter. In this manner, the steady processing of updating the temperature counter is simple and hence a processing load applied to the controller 31 can be reduced.

By this processing, the value of the temperature counter is finally made equal to the ambient temperature Tamb. When the ambient temperature Tamb changes with time, the value of the temperature counter changes along with the ambient temperature Tamb.

FIG. 3A shows a change in the temperature of the motor 20 after stopping the motor 20. As shown by a curve (a) in FIG. 3A, in this example, a motor temperature just after stopping the motor is T0 and the motor temperature decreases exponentially with the lapse of time and then reaches the state of equilibrium. Describing in more detail, the motor temperature reaches the first set temperature T1 at a time t1 and then reaches the second set temperature T1 at a time t2 and then reaches the ambient temperature Tamb at a time t3.

FIG. 3B shows a time axis in FIG. 3A on an enlarged scale. In this embodiment, the first set temperature T1 and the second set temperature T2 are set at 150° C. and 120° C., which are higher than the usual ambient temperature of the device 1, respectively. The curve (b) in FIG. 3B shows a temporal change in the value of the temperature counter updated by the controller 31 of this embodiment.

In this embodiment, to approximate the curve (a) by the curve (b) with high accuracy within a temperature range not less than the first set temperature T, the first temperature gradient $\Delta k1$ is set so that the value of the temperature counter is updated from the temperature T0 of the motor when the motor 20 is stopped to the first set temperature T1 after the lapse of the time ts.

FIG. 4A shows a relationship between the value of the temperature counter when the motor 20 is stopped and the first temperature gradient Δk1, and FIG. 4B shows a relationship between the value of the temperature counter when the motor 20 is stopped and the first temperature subtraction time ts.

That is, by changing the temperature T0 of the motor 20 when the motor 20 is stopped, the time that passes before the motor temperature reaches the first set temperature T1 at each temperature T0 is measured for each changed respective temperature T0 and a correlation between the motor temperature when the motor 20 is stopped and the time that passes before the motor temperature reaches the first set temperature T1 is approximated on the measurement value by a linear function. The ambient temperature at this time is set at a higher temperature in view of protecting the motor 20 from being burned.

The first temperature gradient Δk1 and the first temperature subtraction time ts are set on the basis of this correlation within a temperature range not less than the first set temperature T1.

Hence, the first temperature gradient Δk1 and the first temperature subtraction time ts are uniquely determined by the value of the temperature counter when the motor 20 is stopped. When the value of the temperature counter is updated (reduced by subtractions) on the basis of this first temperature gradient Δk1, as shown in FIG. 3B, the value of the temperature counter is updated to the first set temperature T1 at the time t1 nearly equal to the first temperature subtraction time ts.

Moreover, to approximate the curve (a) by the curve (b) with high accuracy within a temperature range from the first set temperature T1 to the second set temperature T2, by changing the temperature T0 of the motor 20 when the motor 20 is stopped, a temperature change rate (K/s), that is, a differential value of the curve (a) from the first set temperature T1 to the second set temperature T2 is calculated for each changed temperature T0, and a correlation between the motor temperature and the temperature change rate (temperature gradient) is approximated on the basis of this data by a linear function. Here, the ambient temperature is set at a higher temperature in view of protecting the motor 20 from being burned.

As shown in FIG. 5, the second temperature gradient Δk2 is set on the basis of this correlation within a temperature range from the second set temperature T2 to the first set temperature T1.

Hence, after the value of the temperature counter reaches the first set temperature T1, the second temperature gradient Δk2 is uniquely determined according to the value of the temperature counter at the time of performing the repetition processing until the value of the temperature counter reaches the second set temperature T2. When the value of the temperature counter is updated (reduced by subtractions) on the basis of this second temperature gradient Δk2, as shown in FIG. 3B, the value of the temperature counter is updated to the second set temperature T2 along an actual temperature change curve (a). Here, in FIG. 3B, the curve (b) changes linearly from the first set temperature T1 to the second set temperature T2 but actually changes curvedly so as to be brought closer to the curve (a).

The ambient temperature changes according to surroundings in which the device 1 is arranged. For this reason, in this embodiment, to approximate the value of the temperature counter to an actual temperature change from the second set temperature T2 to the ambient temperature at that time, as shown in FIG. 6, the steady temperature gradient Δk3 is set so as to be uniquely determined according to the magnitude of a difference temperature obtained by subtracting the ambient temperature from the value of the temperature counter. In this embodiment, the steady temperature gradient Δk3 is approximated to the difference temperature by a linear function. However, the steady temperature gradient Δk3 may be determined stepwise, for example, according to the magnitude of the difference temperature.

Next, the processing of calculating an estimated temperature by the controller 31 of this embodiment will be described on the basis of FIG. 7 and FIG. 8. This processing of calculating an estimated temperature is processing performed continuously while the device 1 is operating.

Here, in the course of performing this processing, steps S4 to S10 correspond to the first processing of updating the temperature counter, and steps S11 to S13 correspond to the second processing of updating the temperature counter, and steps S14 to S17 correspond to the steady processing of updating the temperature counter.

First, in step S1, the controller 31 determines by a pulse signal from the rotation detecting device 25 whether the motor 20 is operating or is stationary.

When the motor 20 is operating (step S1: No), a temperature correction value is calculated in step S2 from the ambient temperature, the applied voltage, the length of time that electric current is passed, the rotational speed, and the reference data, and the present estimated temperature. Then, in step S3, the temperature correction value is added to the present value of the temperature counter to thereby update the temperature counter. After the end of step S3, step S1 is again executed.

By contrast, when the motor 20 is stationary (step S1: Yes), it is determined in step S4 whether or not the present value of the temperature counter exceeds the first set temperature T1.

When the present value of the temperature counter exceeds the first set temperature T1 (step S4: Yes), the first temperature gradient Δk1 is calculated in step S5 on the basis of the present value of the temperature counter and the calculated first temperature gradient Δk1 is set in a temperature gradient memory (first temperature gradient calculating step).

Moreover, the first subtraction time ts is calculated in step S6 on the basis of the present value of the temperature counter and the calculated first subtraction time ts is set in a subtraction time memory. Further, in step S6, the present time is stored in a processing starting time memory and a processing execution time memory.

In step S7, the processing of updating the temperature counter is performed (first estimated temperature updating step). Specifically, the number of seconds of time passing from the time stored in the processing execution time memory to the present time is calculated, and when the number of seconds is not larger than a predetermined value, a value stored in the temperature gradient memory is multiplied by the calculated number of seconds to calculate a correction value. Then, the correction value is added to the present value of the temperature counter to update the temperature counter. Further, in step S7, the processing execution time memory is updated to the present time.

In step S8, it is determined whether or not the updated value of the temperature counter is larger than the first set temperature T1. When the updated value of the temperature counter is larger than the first set temperature T1 (step S8: Yes), it is determined in step S9 whether or not the first subtraction time ts passes from the time when the processing of updating the temperature counter by the use of the first temperature gradient Δk1 is started. Describing in more detail, in step S9, it is determined whether or not the number of seconds of time passing from the time stored in the processing starting time to the present time is larger than the first subtraction time ts stored in a subtraction time memory.

When it is determined in step S8 that the updated value of the temperature counter is not larger than the first set temperature T1 (step S8: No), to proceed to the processing of updating the next second processing of updating the temperature counter, the routine returns to step S1. At this time, the temperature gradient memory, the subtraction time memory, the processing starting time memory, and the processing execution time memory are initialized.

When the first subtraction time ts does not pass from the time when the processing of updating the temperature counter by the use of the first temperature gradient Δk1 is started (step S9: No), it is determined in step S10 whether or not the motor 20 is stationary.

When it is determined in step S10 that the motor 20 is stationary (step S10: Yes), to again perform the processing of updating the temperature counter by the use of the first temperature gradient Δk1, the routine returns to step S7.

In this manner, when the value of the temperature counter is larger than the first set temperature T1 and the first subtraction time does not pass and the motor is held stopped, the first processing of updating the temperature counter is repeatedly performed.

By contrast, when it is determined in step S9 that the first subtraction time ts passes from the time when the processing of updating the temperature counter by the use of the first temperature gradient Δk1 is started (step S9: Yes), the routine returns again to step S1.

Moreover, when it is determined in step S10 that the motor 20 is operating (step S10: No), the routine returns to step S1 and then steps S2 and S3 are repeatedly executed.

Here, when the routine returns from steps S9 and S10 to step S1, the temperature gradient memory, the subtraction time memory, the processing starting time memory, and the processing execution time memory are initialized.

When it is determined in step S4 that the value of the temperature counter is not larger than the first set temperature T1 (step S4: No), it is determined in step S11 whether or not the value of the temperature counter is larger than the second set temperature T2.

When the value of the temperature counter is larger than the second set temperature T2 (step S11: Yes), the second temperature gradient Δk2 is calculated in step S12 on the basis of the present value of the temperature counter and the calculated second temperature gradient Δk2 is set in the temperature gradient memory (second temperature gradient calculating step).

In step S13, the processing of updating the temperature counter is performed (second estimated temperature updating step). Specifically, the number of seconds of time passing from the time stored in the processing execution time memory to the present time is calculated, and when this number of seconds is not larger than a predetermined value, the value stored in the temperature gradient memory is multiplied by the calculated number of seconds to calculate a correction value. Then, the correction value is added to the present value of the temperature counter to update the temperature counter. Further, in step S13, the processing execution time memory is updated to the present time.

In this manner, when the value of the temperature counter is larger than the second set temperature T2 but not larger than the first set temperature T1 and the motor 20 is held stopped, the second temperature counter updating processing is repeatedly performed.

When the value of the temperature counter becomes not larger than the second set temperature T2 (step S11: No), it is determined in step S14 whether or not the value of the temperature counter is larger than the ambient temperature Tamb calculated on the basis of the temperature sensor 33.

When it is determined in step S14 that the value of the temperature counter is larger than the ambient temperature Tamb (step S14: Yes), the steady temperature gradient Δk3 is calculated in step S15 on the basis of a difference temperature obtained by subtracting the ambient temperature from the present value of the temperature counter and the calculated steady temperature gradient Δk3 is set in the temperature gradient memory (steady temperature gradient calculating step).

In step S16, the processing of updating the temperature counter is performed (steady estimated temperature updating step). Specifically, the number of seconds of time passing from the time stored in the processing execution time memory to the present time is calculated, and when this number of seconds is not larger than a predetermined value, the value stored in the temperature gradient memory is multiplied by the calculated number of seconds to calculate a correction value. Then, the correction value is added to the present value of the temperature counter to update the temperature counter. Further, in step S16, the processing execution time memory is updated to the present time and then the routine returns again to step S1.

In this manner, when the value of the temperature counter is larger than the ambient temperature Tamb, the value of the temperature counter is brought close to the ambient temperature Tamb.

By contrast, when it is determined in step S14 that the value of the temperature counter is not larger than the ambient temperature Tamb (step S14: No), the value of the temperature counter is set in step S17 at the ambient temperature and then the routine returns again to step S1.

In this manner, when the value of the temperature counter is not larger than the second set temperature T2 and the motor 20 is held stopped, the steady temperature counter updating processing is repeatedly performed. When the value of the temperature counter is once made equal to the ambient temperature by this processing, even if the ambient temperature changes up and down thereafter, the value of the temperature counter can be changed following the change.

That is, according to the motor controller of the present invention, within a temperature range in which a reduction rate of the motor temperature is large while the motor is stationary, the temperature gradient to reduce the estimated temperature of the motor by subtractions is determined by the estimated temperature of the motor when the motor is stopped and the estimated temperature is updated by the use of this temperature gradient with the lapse of the motor stopping time. By contrast, when the motor temperature is lower than a temperature range in which the reduction rate of the motor temperature is largest, the estimated temperature is updated by the use of the temperature gradient of the motor temperature at the time of update. Further, when the estimated temperature is brought closer to the ambient temperature, the estimated temperature is updated by the temperature gradient determined by the difference temperature between the estimated temperature and the ambient temperature. In this manner, in the present invention, the temperature gradient to perform the processing of updating the estimated temperature is determined as appropriate and the updating processing using this temperature gradient is of light load. Hence, the present invention can keep the calculated estimated temperature in an excellent accuracy and can reduce the load of the entire processing.

In the above-mentioned embodiment has been described the example in which the first temperature gradient Δk1, the first temperature subtraction time ts, the second temperature gradient Δk2, and the steady temperature gradient Δk3 are approximated by linear functions, as shown in FIGS. 4A and 4B, FIG. 5 and FIG. 6. However, they may be approximated by stepwise functions according to the value of the temperature counter or may be approximated by higher-order functions for predetermined temperature ranges.

Moreover, in the above-mentioned embodiment, the correction values for updating the value of the temperature counter are calculated by multiplying the temperature gradients (Δk1, Δk2, Δk3) by the time that passes from the last update time. However, the repetition processing time is set at a constant value in each temperature counter updating processing and the temperature gradients may be set according to this repetition time. In other words, when the temperature gradient is not set as a variation per unit time like the above-mentioned embodiment but the temperature gradient is set as a variation per repetition processing time, the processing of calculating the correction value can be more simplified.

In the above-mentioned embodiment has been described the example in which the present invention is applied to the power window device 1. However, the present invention can be applied to all devices provided with a motor.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor controller comprising:
an estimated temperature calculating section that calculates an estimated temperature of a motor, and a motor control section that can perform a drive control of the motor only when the estimated temperature is not larger than a predetermined value,
wherein the estimated temperature calculating section is provided with:
an estimated temperature storing means that stores the estimated temperature;
a first temperature gradient storing means that stores a second temperature gradient while the temperature of the motor decreases from a stop-time temperature to a predetermined first set temperature in correspondence to the stop-time temperature when the motor is stopped;
a first temperature gradient calculating means that calculates the first temperature gradient corresponding to the estimated temperature at a time when the motor is stopped from the first temperature gradient storing means in a case that the estimated temperature stored in the estimated temperature storing means when the motor is stopped is larger than the first set temperature; and
a first estimated temperature updating means that updates the estimated temperature stored in the estimated temperature storing means according to a lapse of a stopping time of the motor by using the first temperature gradient calculated by the first temperature gradient calculating means.

2. The motor controller as claimed in claim 1, wherein the estimated temperature calculating section is provided with:
a second temperature gradient storing means that stores a second temperature gradient while the temperature of the motor decreases from the first set temperature to a predetermined second set temperature in correspondence to each temperature of the motor;
a second temperature gradient calculating means that calculates the second temperature gradient corresponding to the estimated temperature by using the second temperature gradient storing means in a case that the estimated temperature stored in the estimated temperature storing means is within a temperature range from the first set temperature to the second set temperature; and
a second estimated temperature updating means that updates the estimated temperature stored in the estimated temperature storing means according to the lapse of a stopping time of the motor by using the second temperature gradient calculated by the second temperature gradient calculating means.

3. The motor controller according to claim 2, further comprising an ambient temperature detecting section that detects an ambient temperature, the ambient temperature being a temperature of a peripheral portion surrounding the motor, wherein the estimated temperature calculating section is provided with:
a steady temperature gradient storing means that stores a third temperature gradient while temperature of the motor decreases from the second set temperature to the ambient temperature in correspondence to a difference temperature between the temperature of the motor and the ambient temperature;
a steady temperature gradient calculating means that calculates the third temperature gradient corresponding to the difference temperature between the estimated temperature and the ambient temperature detected by the ambient temperature detecting section by using the steady temperature gradient storing means in a case that the estimated temperature stored in the estimated temperature storing means is within a temperature range not higher than the second set temperature; and
a steady estimated temperature updating means that updates the estimated temperature stored in the estimated temperature storing means according to the lapse of a stopping time of the motor by using the third temperature gradient calculated by the steady temperature gradient calculating means.

4. The motor controller as claimed in claim 1, wherein the first temperature gradient stored in the first temperature gradient storing means is defined as a linear function of the stop-time temperature.

5. The motor controller as claimed in claim 2, wherein the second temperature gradient stored in the second temperature gradient storing means is defined as a linear function of the estimated temperature.

6. The motor controller as claimed in claim 3, wherein the third temperature gradient stored in the steady temperature gradient storing means is defined as a linear function of the difference temperature.

7. A motor temperature estimation method for a motor controller provided with an estimated temperature calculating section that calculates an estimated temperature of a motor, and a motor control section that can perform a drive control of the motor only when the estimated temperature is not larger than a predetermined value, the motor temperature estimation method comprising;
a first temperature gradient storing step that stores a first temperature gradient while a temperature of the motor decreases from a stop-time temperature to a predetermined first set temperature in correspondence to the stop-time temperature when the motor is stopped;

a first temperature gradient calculating step that calculates the first temperature gradient corresponding to the estimated temperature at a time when the motor is stopped from the first temperature gradient storing means in a case that the estimated temperature stored in the estimated temperature storing means when the motor is stopped is larger than the first set temperature; and a first estimated temperature updating step that updates the estimated temperature stored in the estimated temperature storing means according to a lapse of a stopping time of the motor by using of the first temperature gradient calculated by the first temperature gradient calculating means.

8. The motor temperature estimation method according to claim 7, further comprising:

a second temperature gradient storing step that stores a second temperature gradient while the temperature of the motor decreases from the first set temperature to a predetermined second set temperature in correspondence to each temperature of the motor;

a second temperature gradient calculating step that calculates the second temperature gradient corresponding to the estimated temperature based on the second temperature gradient storing step in a case that the estimated temperature stored in the estimated temperature storing means is within a temperature range from the first set temperature to the second set temperature; and a second estimated temperature updating step that updates the estimated temperature stored in the estimated temperature storing means according to the lapse of a stopping time of the motor by using the second temperature gradient calculated by the second temperature gradient calculating means.

9. The motor temperature estimation method according to claim 8, further comprising:

a steady temperature gradient storing step that stores a third temperature gradient while temperature of the motor decreases from the second set temperature to the ambient temperature in correspondence to a difference temperature between the temperature of the motor and the ambient temperature;

a steady temperature gradient calculating step that calculates the third temperature gradient corresponding to the difference temperature between the estimated temperature and the ambient temperature detected by the ambient temperature detecting section based on the steady temperature gradient storing step in a case that the estimated temperature stored in the estimated temperature storing means is within a temperature range not higher than the second set temperature; and a steady estimated temperature updating step that updates the estimated temperature stored in the estimated temperature storing means according to the lapse of a stopping time of the motor by using the third temperature gradient calculated by the steady temperature gradient calculating means.

* * * * *